US007366147B2

(12) United States Patent
O'Neill

(10) Patent No.: US 7,366,147 B2
(45) Date of Patent: Apr. 29, 2008

(54) METHODS AND APPARATUS FOR TUNNELING BETWEEN DIFFERENT ADDRESSING DOMAINS

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 876 days.

(21) Appl. No.: 10/413,888

(22) Filed: Apr. 14, 2003

(65) Prior Publication Data

US 2004/0047322 A1 Mar. 11, 2004

Related U.S. Application Data

(60) Provisional application No. 60/372,655, filed on Apr. 15, 2002.

(51) Int. Cl.
*H04Q 7/24* (2006.01)
*H04L 12/28* (2006.01)

(52) U.S. Cl. .............. 370/338; 370/389; 370/401

(58) Field of Classification Search ........... 370/389, 370/392, 400, 401, 402, 403, 404
See application file for complete search history.

(56) References Cited

U.S. PATENT DOCUMENTS

| 5,572,528 | A | 11/1996 | Shuen |
| 5,806,007 | A | 9/1998 | Raith et al. |
| 5,898,922 | A | 4/1999 | Reininghaus |
| 5,903,559 | A | 5/1999 | Acharya et al. |
| 5,987,323 | A | 11/1999 | Huotari |
| 6,256,300 | B1 | 7/2001 | Ahmed et al. |
| 6,434,134 | B1 | 8/2002 | La Porta et al. |
| 6,445,922 | B1 | 9/2002 | Hiller et al. |
| 6,452,920 | B1 * | 9/2002 | Comstock ............... 370/349 |
| 6,466,964 | B1 * | 10/2002 | Leung et al. ............. 709/202 |
| 6,496,505 | B2 | 12/2002 | La Porta et al. |
| 6,505,047 | B1 | 1/2003 | Palkisto |
| 6,510,144 | B1 | 1/2003 | Dommety et al. |
| 6,519,254 | B1 | 2/2003 | Chuah et al. |

(Continued)

OTHER PUBLICATIONS

PCT International Search Report, for International Application No. PCT/US03/11472, Jul. 15, 2003.

(Continued)

*Primary Examiner*—Chau Nguyen
*Assistant Examiner*—Marcus R Smith
(74) *Attorney, Agent, or Firm*—Straub & Pokotylo; Michael P. Straub; Ronald P. Straub

(57) ABSTRACT

Methods and apparatus for enhancing Mobile IP (MIP) signaling and to support the use of a novel proxy Co-located Care-of Address (PCCoA) are described. The enhanced MIP signaling adds the ability for the Mobile Node (MN) to acquire a MN specific Foreign Agent (FA) CoA that provides the MN with a topologically correct local address yet whose tunnel encapsulation/decapsulation is provided by the FA. This address is called a proxy CCoA (PCCoA) and the associated processing in the MN and FA is called Proxy CCoA tunneling. This capability is applicable to any access technology but is especially useful for wireless systems where the access bandwidth is expensive and when point-to-point link-layer connectivity exists between the MN and the FA. A method is supported for reverse tunneling and smooth hand-off extensions based on the PCCoA that enables inter-FA forwarding even for CCoAs.

22 Claims, 9 Drawing Sheets

U.S. PATENT DOCUMENTS

| | | | |
|---|---|---|---|
| 6,567,416 B1 | 5/2003 | Chuah | |
| 6,567,664 B1 | 5/2003 | Bergenwall et al. | |
| 6,571,289 B1 | 5/2003 | Montenegro | |
| 6,647,001 B1 | 11/2003 | Bhagavath et al. | |
| 6,684,256 B1* | 1/2004 | Warrier et al. | 709/238 |
| 6,707,809 B1* | 3/2004 | Warrier et al. | 370/351 |
| 6,711,147 B1* | 3/2004 | Barnes et al. | 370/338 |
| 6,763,007 B1 | 7/2004 | La Porta et al. | |
| 6,839,337 B2 | 1/2005 | Newberg et al. | |
| 6,856,624 B2* | 2/2005 | Magret | 370/392 |
| 6,892,069 B1 | 5/2005 | Flynn | |
| 6,937,590 B2* | 8/2005 | Lee | 370/338 |
| 6,980,802 B2* | 12/2005 | Jung | 455/436 |
| 7,068,640 B2* | 6/2006 | Kakemizu et al. | 370/349 |
| 2001/0036184 A1* | 11/2001 | Kinoshita et al. | 370/389 |
| 2002/0018456 A1 | 2/2002 | Kakemizu et al. | |
| 2002/0026527 A1* | 2/2002 | Das et al. | 709/245 |
| 2002/0191593 A1 | 12/2002 | O'Neill et al. | |
| 2003/0137961 A1 | 7/2003 | Tsirtsis et al. | |
| 2003/0176188 A1 | 9/2003 | O'Neill | |

OTHER PUBLICATIONS

Network Working Group, "IP Mobility Support for IPv4", C. Perkins, Ed., Nokia Research Center, Jan. 2002, downloaded from http://www.ietf.org on Dec. 29, 2004, pp. 1-92.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

C. Perkins, Editor "IP Mobility Support", Network Working Group, pp. 1-79 (Oct. 1996).

Li, Yalun, "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Information Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM Sigmobile Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

BOS, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it. publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

* cited by examiner

METHODS AND APPARATUS FOR TUNNELING BETWEEN DIFFERENT ADDRESSING DOMAINS

RELATED APPLICATIONS

The present application claims the benefit of the filing date of U.S. Provisional Patent Application No. 60/372,655 filed Apr. 15, 2002 titled "Communications Methods and Apparatus".

FIELD OF THE INVENTION

The present application relates to communications methods and, more particularly, to methods and apparatus for supporting encapsulation and tunnelling between network domains which use different address prefixes.

BACKGROUND

In Mobile Internet Protocol version 4 (MIPv4), when a Mobile Node (MN) registers with the 'D' bit, in the MIP Registration to a Home Agent (HA), then the MN wishes to use a Co-located Care-of address (CCoA) with a specific Home Address (HoA). Packets sent to the MN Home Address (HoA) will then be encapsulated in the CCoA by the HA and forwarded directly to the MN. Alternatively, a MN can obtain from the local Foreign Agent (FA) a shared FA CoA for inclusion in its MIP Registration to the FA/HA. In this case, the HA encapsulates to the FA CoA, and the Foreign Agent then decapsulates and delivers the HoA addressed packet unencapsulated to the MN.

Mobile IP (v4/v6), also indicated as MIPv4 [MIPv4] and MIPv6 [MIPv6], enables a mobile node (MN) to register its temporary location indicated by a care-of-address (CoA) to its Home Agent (HA). MIPv6 is described in D. Johnson, C. Perkins, "Mobility Support in IPv6", Internet-Draft, draft-ietf-mobileip-ipv6-16.txt (work in progress), Mar. 22, 2002. The HA then keeps a mapping (also called a binding) between the MN's permanent address, otherwise called Home Address (HoA), and the registered CoA so that packets for that MN can be redirected to its current location using IP encapsulation techniques (tunneling). The CoA used by a MN can be an address that belongs to a Foreign Agent (FA) when MIPv4 is used or, in MIPv4 and MIPv6, it can be a temporarily allocated address to the MN itself in which case is called a collocated care-of-address (CCoA).

During MIP hand-off, the FAs are generally used to reroute traffic from the old FA (oFA) to the new FA (nFA). This however is only possible from the oFA if the MN was using a FA CoA at that oFA. The oFA can then change the CoA to either a CCoA of a MN or a FA CoA at the new FA. The oFA could also switch CCoAs if it has the necessary state and permissions, and the newFA could also deal with CCoAs if it is able to similarly deal with them correctly.

In MIPv4, when a MN registers with the 'D' bit, in the MIP Registration to a Home Agent through a Foreign Agent, then the MN wishes to use a Co-located Care-of address (CCoA) with a specific Home Address (HoA). Packets sent to the MN Home Address (HoA) will then be encapsulated in the CCoA by the HA and forwarded directly to the MN via the best route from any FA advertising the subnet of that address. In addition, the MN can use that CCoA as a topologically correct source/destination address for local access on the visited subnet. Different address prefixes are commonly used by different addressing domains. In CCoA based reverse tunneling, the MN can encapsulate the HoA itself into its Co-located Care of Address (CCoA) to cause the packet to be reverse tunneled to the HA. The MN can in addition leave the HoA unencapsulated so that the FA delivers the packet natively and unencapsulated to the destination address. This is known as selective reverse tunneling and is possible whether or not the MN registers via the local FA.

Alternatively, a MN can use a shared FA CoA advertised to it by the FA in an Agent Advertisement. In this case, the HA encapsulates to the FA CoA who then decapsulates and delivers the HoA addressed packet natively unencapsulated to the MN. When reverse tunneling, the MN can select during MIP registration between the default Direct Delivery Style and the optional Encapsulating Delivery Style.

In Direct Delivery Style, the MN sends packets unencapsulated via the FA using the HoA as a source address, and the FA undertakes the encapsulation of those packets towards the HA using the FA CoA as the source address of the tunnel.

In Encapsulating Delivery Style, the MN instead encapsulates packets with the HoA as a source address towards the FA, which after decapsulating, inspects the visitor list and then re-encapsulates into a tunnel with the FA CoA as the source address. In addition, once Encapsulating Delivery Style has been negotiated with the FA, then the MN can selectively bypass reverse tunneling by sending packets unencapsulated from the HoA.

MIPv6 has the use of a CCoA by the MN as the normal method of tunneling due to the better address availability and allocation mechanisms compared to IPv4.

The MN and the FA in existing MIP specs are therefore able to selectively send and receive packets, either unencapsulated, or encapsulated using the HoA as an inner source/destination address and a CoA as the outer address. When sending unencapsulated between each other, the MN and the FA avoid the additional bandwidth incurred by a tunnel header. By using a FA CoA, the MN is however deprived of a local topologically correct address (so preserving address space) but is able to selectively avoid tunneling over the access link, which is beneficial in cellular and other access systems. By using a CCoA, the MN gets a topologically correct address (where addresses are available) but then incurs the overhead of the additional tunnel header for incoming traffic and during any reverse tunneling operations. The use of a MN specific MIP tunnel address can also be useful for QoS support. What is missing in MIP is the ability for the MN to acquire a MN specific FA CoA that provides the MN with a topologically correct local address yet whose tunnel encaps/decaps is provided by the FA.

In view of the above discussion, it can be appreciated that it would be beneficial if a way could be found to provide MNs with an MN specific FA CoA and if ways of using tunnelling with such addresses could be developed which would allow tunnelling using such addresses even though ends of the created tunnels may be in addressing domains which use different address prefixes.

SUMMARY OF INVENTION(S)

The present invention is directed to methods and apparatus for enhancing mobile communications in the case where a mobile node (MN) is located in a visited network that is in a different addressing domain from the mobile node's home network. While in the visited network, the visited network's addressing prefix is used to route packets while packets are routed in the mobile node's home domain using a different address prefix.

The methods of the present invention may be used, and allow for, packets to be routed to/from a mobile node through multiple addressing domains. For example, the mobile node may be in a first addressing domain, the mobile node's home agent (HA) in a second addressing domain and a correspondence node (CN) with which the MN is communicating in still yet another addressing domain.

In accordance with one feature of the invention, MNs are assigned specific FA CoAs called herein Proxy CCoAs. A Proxy Colocated Care of Address (PCCoA), in accordance with the present invention, is a MN specific FA CoA, which provides the MN with a topologically correct local address yet whose tunnel encapsulation/decapsulation is provided by the FA. Proxy CCoAs are designed to enable the FA to manage state in cooperation with the MN so that it can handle the tunnelling for the MN and can deal correctly with forwarded traffic during a hand-off. The associated processing, relating to the PCCoAs, in the MN and FA, in accordance with the present invention, is called Proxy CCoA tunnelling for purposes of discussing the invention. Various features of the invention are also directed to reverse tunnelling and smooth hand-off extensions based on the PCCoA.

Use of PCCoAs avoids or reduces encapsulation overhead associated with potentially expensive access links, e.g., wireless links between a mobile node and access node operating as an FA. The negotiation of a PCCoA is a local matter between the MN and the FA and there is no need for a mobile node's HA to be informed of the optional configuration of the PCCoA capability by the MN on the local FA. The HA can simply detect a MIP request generated in accordance with the invention, via the FA, for CCoA tunnelling. According to Mobile IPv4 [MIPv4] and Reverse Tunneling [RevTun], the HA will expect the following tunneling to occur. MIPv4 is described in detail in C. E. Perkins, Ed., "IP Mobility Support for IPv4," RFC3220, January 2002. Reverse Tunnelling as referred to in the current context is described in [RevTun] G. Montenegro, Ed., "Reverse Tunnelling for Mobile IP, revised," Internet RFC 3024, January 2001.

The communications methods of the present invention may be applied to systems including a plurality of nodes, e.g., a first node, a second node, a third node and a fourth node. The first node may be, e.g., a mobile node (MN). The second node may be, e.g., the correspondence node (CN) with which said MN is communicating. The CN may be, e.g., another MN or some other network node. The third node may be, e.g., a node which servers as the MN's foreign agent (FA). The fourth node may be, e.g., a node which operates as the MN's home agent (HA). Packets communicated between the MN and CN may, in accordance with MIP be routed through the MN's FA and HA as part of the communication process. The various nodes may be located in different addressing domains, having different addressing prefixes associated with each of the different addressing domains and the nodes located therein.

Thus, as packets are communicated between the MN and CN they may pass through multiple addressing domains and, in accordance with the present invention, be subject to various encapsulation/tunnelling operations to overcome problems which can result from different address prefixes being used in the different addressing domains.

As part of one exemplary communication process between a mobile node (MN) and a correspondence node (CN), the mobile node transmits a packet towards the CN using a first address that corresponds to the MN as a source address and a second address associated with the CN as a destination address. The third node, e.g., MIP FA intercepts said packet, which not addressed to the FA, and encapsulates it into a tunnel using a third address which serves as the source address of the tunnel. The third address has a first prefix which is associated with the MIP FA, e.g., corresponds to the addressing domain in which the MIP FA is located. The third address is not however a shared FA CoA but has been assigned to the MN as an interface address which may therefore be used as a Colocated Care of Address (CCoA). As part of the encapsulation process, a fourth address corresponding to a fourth node, e.g., the MN's HA, is added to the packet being encapsulated. This fourth address serves as a destination address of the tunnel. Thus, packets may be tunnelled between the MN's FA and HA. In such an embodiment the first address corresponding to the MN includes an address prefix which corresponds to the HA, e.g., corresponds to the address prefix used by the addressing domain in which the HA is located. This address prefix may be called a second address prefix simply to distinguish it from the first address prefix associated with the addressing domain in which the FA is located. The first and second prefixes will be different in those cases where the FA and HA are located in different addressing domains as is often the case. Note that in this example the address used by the MN while in the first addressing domain as a source address when sending a packet to the CN is an address which included the address prefix corresponding to the HA's domain rather than the FA's domain.

The third address, i.e., the tunnel source address may be a co-located care of address (CCoA). In addition to forwarding packets towards the CN, the FA may receive and transmit packets to the MN. The packets may be unencapsulated packets originating from the CN but which were encapsulated by the HA for transmission to the MN's CCoA via the FA. Each encapsulated packet may include an inner packet having said second address as a source address and the first address associated with the MN as a destination address. The FA intercepts and decapsulates the inner packets and forwards them to the first node despite the fact that the first address includes an address prefix corresponding to the addressing domain of the HA.

An addressing table in the FA may be used to facilitate this decapsulation and forwarding process. The addressing table identifies the mac-layer address of the interface of each MN and the associated PCCoA address of each MN. The FA inspects the destination address of the tunnel to find the PCCoA, determines the mac-address of the MN, and forwards the decapsulated packets to that mac-address in point to point link layer frames. This addressing table can also assist with upstream traffic from the MN to the CN as the incoming mac_address of the MN can be used by the FA to determine the required PCCoA to be used as a source address for the tunnel to the HA. If the home address of the MN is also stored at the FA in this table, then this address can also be inspected to determine the correct PCCoA and mac_layer addresses.

In a further embodiment of the invention, the MN can send unencapsulated packets over the access link, with the home address as a source address and a multicast destination address, towards a group of CNs who are members of that group. The FA can then encapsulate into the PCCoA to HA tunnel by again using either the mac_address of the MN or the home address to identify the correct PCCoA. The packets over the access link must use a point to point link to the FA to avoid being received by members of that group on that access link. Similarly, the CN can send packets towards a multicast group of which the MN is a member at its HA, causing the HA to encapsulate these packets to the PCCoA of the MN which is intercepted and decapsualted by the FA.

The FA uses the incoming PCCoA to identify the destination MN and its mac_layer address, before forwarding unencapsulated into a point to point link to the MN. The point to point link again avoids the multicast packets being received by other members of that group on the access link.

In a further embodiment of the invention, a MIP signal is used between the MN and the FA to request that the FA undertake tunnel management for the CCoA of the MN, which converts it into a PCCoA. The FA can agree to this request with a reply message, if it supports the PCCoA capabilities of the invention, and then the MN can safely send unencapsulated packets towards the CN via the FA, which will then undertake the tunnelling. In addition, the MN will expect to receive unencapsulated packets from the CN via the FA which will be undertaking the decapsulation on behalf of the MN.

In a further embodiment of the invention, the Mnc an decide to use CCoA forwarding in the FA (ie undertake tunnel management itself), but use a hand-off signal to the FA to cause it to temporarily move to PCCoA processing so that it, rather than the MN can undertake the forwarding of in-flight packets to the new CoA of the MN at the next FA. This new CoA is the fifth address of the invention from an access node that is the fifth node. During a hand-off, the table mapping no longer points to the mac_address of the MN but is instead populated with the fifth address so that the encapsulation can be triggered before sending the packet to the new CoA. The PCCoA processing enables the FA to decapsulate from the old PCCoA and then re-encapsulate into the new CoA, which could be either a FA CoA, a CCoA or a PCCoA. If the new CoA is a FA CoA then the old FA may use the old PCCoA as the source address for the tunnel towards the access node so that the access node can uniquely map that tunnel to the MN at the access node (the fifth node). Alternatively, the fifth node can use the Home address of the inner packet to identify the MN.

In the final embodiment of the invention, the MN has been assigned the CCoA as an interface address at the FA and so may use that as a source/destination address for communication with the CN which does not require the use of the home agent or associated tunnelling. For packets sent from the MN, the FA must detect that the PCCoA is associated with an unencapsulated packet and to therefore simply send it towards the CN rather than encapsulating it into a tunnel to the HA. For packets from the CN to the MN, the packets will arrive unencapsulated to the FA which must therefore not attempt to decapsulate the packet but should simply map between the PCCoA and the mac_address of the associated MN before forwarding to the packet via the link layer to that MN.

The concepts and solutions described here are applicable to both MIPv4 and MIPv6 unless otherwise mentioned. While IPv6 does not have the notion of a Foreign Agent, an access router could be modified in accordance with the invention to support a MIP Attendant or other Local Mobility Agent to undertake the PCCoA functionality defined of the present invention, described in the context of an FA.

In MIP v6 hand-off, the option of receiving a Binding Update (BU) including a new FA CoA is not possible and the new CoA can only be either a CCoA or a PCCoA. A MN in MIPv6 can selectively reverse tunnel simply by the use or absence of the CCoA encapsulation to the HA but this option is lost with a PCCoA because the FA will always encapsulate packets into the PCCoA for tunnelling to the HA, although a classifier could be used to select PCCoA processing in the FA for only a subset of packet flows.

The present summary describes some of the features, embodiments and benefits of the methods and apparatus of the present invention, numerous additional features, embodiments and benefits are discussed in the detailed description which follows.

DETAILED DESCRIPTION

Figure 1:
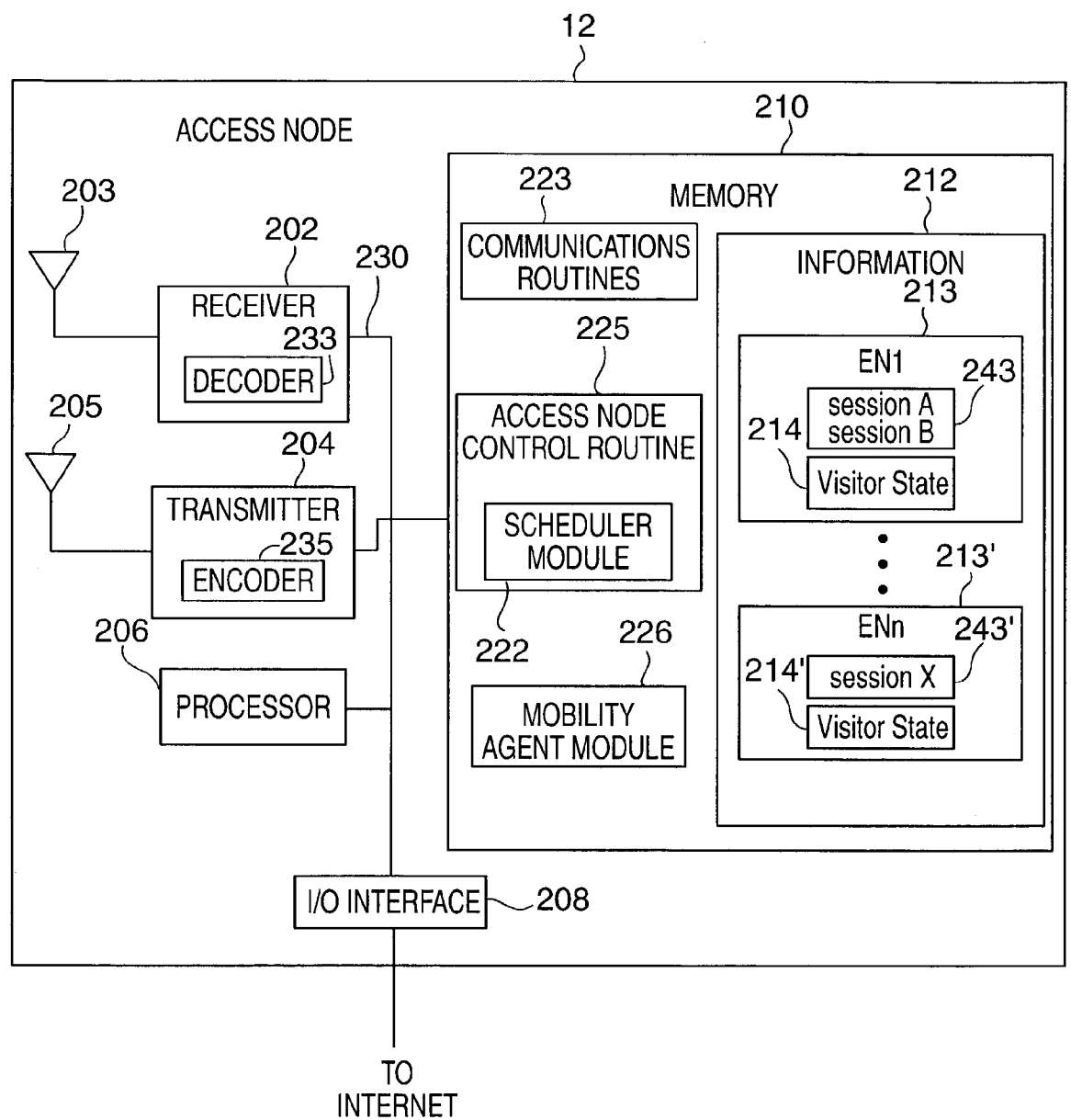
FIG. 1 illustrates an exemplary access node implemented in accordance with the present invention.

FIG. 1 illustrates an exemplary access node 12, e.g., access router or base station, implemented in accordance with the invention. The access node 12 includes antennas 203, 205 and corresponding receiver, transmitter circuitry 202, 204, respectively. The receiver circuitry 202 includes a decoder 233 while the transmitter circuitry 204 includes an encoder 235. The circuitry 202, 204 is coupled by a bus 230 to an I/O interface 208, a processor (e.g., CPU) 206 and memory 210. The I/O interface 208 couples the access node 12, e.g., base station, to the Internet. The memory 210 includes routines, which when executed by the processor 206, cause the access node 12 to operate in accordance with the invention. Memory includes communications routines 223 used for controlling the access node 12 to perform various communications operations and implement various communications protocols. The memory 210 also includes an access node control routine 225 used to control the access node's 12, e.g. base station's, operation and signaling to implement the steps of the method of the present invention. The access node control routine 225 includes a scheduler module 222 used to control transmission scheduling and/or communication resource allocation. Thus, module 222 may serve as a scheduler. The memory 210 also includes a mobility agent module 226 used to process and send mobility related signaling implementing the steps of the method of the present invention. Thus, module 226 may serve as a Mobile IP Foreign Agent. Memory 210 also includes information 212 used by communications routines 223, control routine 225 and mobility agent module 226. The information 212 includes an entry 213, 213' for each active end node, which includes a list of the active sessions 243, 243' being conducted by the end node and includes tunneling state associated with said end node. In particular, information for end node 1 213 includes active session list 243, listing exemplary sessions A and B. Information for end node 1 213 also includes visitor list state 214, shown in detail in FIG. 3. Information about end node N 213' as depicted in FIG. 1 includes exemplary session X 243' and also includes visitor list state 214', shown in detail in FIG. 3.

Figure 2:
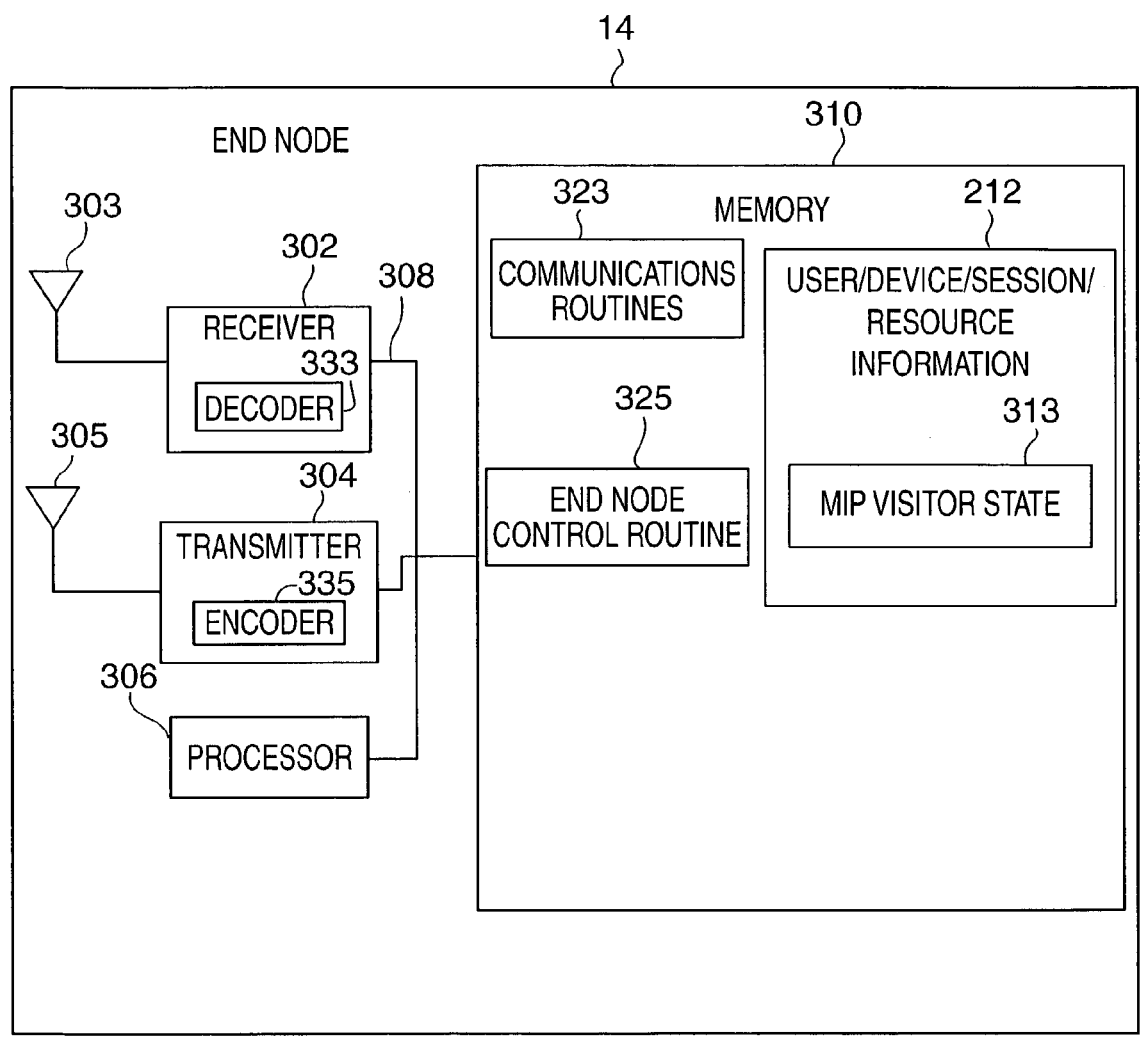
FIG. 2 illustrates an exemplary end node implemented in accordance with the present invention.

FIG. 2 illustrates an exemplary end node 14 implemented in accordance with the present invention. The end node 14 may be used by a user as a mobile terminal (MT). The end node 14 includes receiver and transmitter antennas 303, 305 which are coupled to receiver and transmitter circuitry 302, 304 respectively. The receiver circuitry 302 includes a decoder 333 while the transmitter circuitry 304 includes an encoder 335. The receiver transmitter circuits 302, 304 are coupled by a bus 308 to a memory 310 and a processor 306. Processor 306, under control of one or more routines stored in memory 310, causes the end node 14 to operate in accordance with the methods of the present invention. In order to control operation of the end node 14, memory 310 includes communications routine 323 and end node control routine 325. The end node communications routine 323 is used for controlling the end node 14 to perform various communications operations and implement various communications protocols. The end node control routine 325 is responsible for insuring that the end node operates in accordance with the methods of the present invention and performs the steps described in regard to end node operations and signaling. The memory 310 also includes user/device/session/resource information 312 which may be accessed and used to implement the methods of the present invention and/or data structures used to implement the invention. In particular, User/Device/Session/Resource information 312 includes MIP visitor state information 313 described in detail in FIG. 3.

Figure 3:
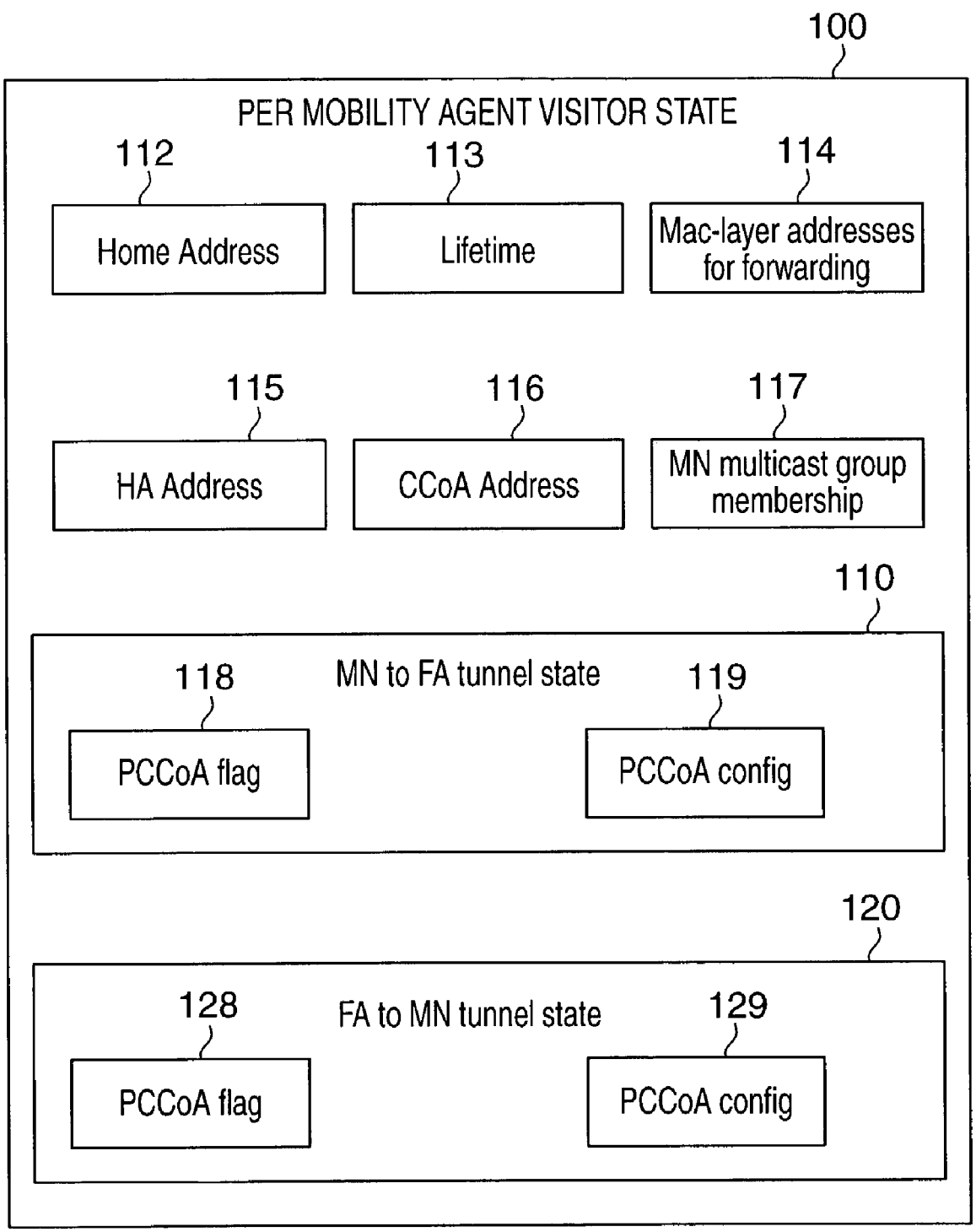
FIG. 3 illustrates the contents of visitor list state which are exemplary of the visitor list state shown in FIGS. 1, 2, and 4.

FIG. 3 illustrates exemplary tunnel state 100, associated with a given mobility agent. The exemplary tunnel state 100 may be used as visitor state 414 or 414' of FIG. 4, the visitor list state 214, 214' shown in FIG. 1, and visitor list state 313 shown in FIG. 2. The visitor list state 100 is sometimes called a visitor list table since it includes a plurality of visitor list entries that can be accessed using table access techniques. From the perspective of the access node 12 and the end node 14 of FIGS. 1 and 2 respectively visitor list state 100 may include a number of tunnel state entries 110, 120.

According to this invention Visitor state 100 includes entries for at least one MN 14, each entry including state for the MN home address (HoA) 112, a Home Agent address 115, a CCoA 116, a lifetime 113, and mac-layer addresses 114 of the link between the MN 14 and the Access Node (e.g., Foreign Agent) 12. The mac-layer addresses 114 are used for forwarding. The visitor list state 100 can also include information on the multicast group membership of the MN 14 so that multicast packets to and from the MN 14 can be policed and forwarded.

The visitor list entry also includes according to this invention a MN to FA tunnel state 110 which includes a PCCoA flag 118 and PCCoA configuration state 119. The setting of the PCCoA flag indicates that the CCoA address 116 is converted to a PCCoA address for traffic from the MN 14, and tunneling should be performed according to the PCCoA configuration 119. The Foreign Agent (FA) 12 and not the MN 14 will then add the encapsulation to packets from the MN home address 112, said encapsulation having a PCCoA source address 116 and a HA destination address 115. Lifetime 113 is a timer associated with said visitor list state 100. When lifetime 113 expires visitor state regarding MN 14 with home address 112 is removed.

The visitor list entry also includes according to this invention the FA to MN tunnel state 120 which includes a PCCoA flag 128 and PCCoA configuration state 129. The setting of the PCCoA flag indicates that the CCoA address 116 is converted to a PCCoA address for traffic to the MN 14, and detunneling should be performed according to the PCCoA configuration 129. The FA 12 and not the MN 14 will then remove the encapsulation on packets to the MN home address 112, said encapsulation having a PCCoA destination address 116 and a HA source address 115.

Figure 4:
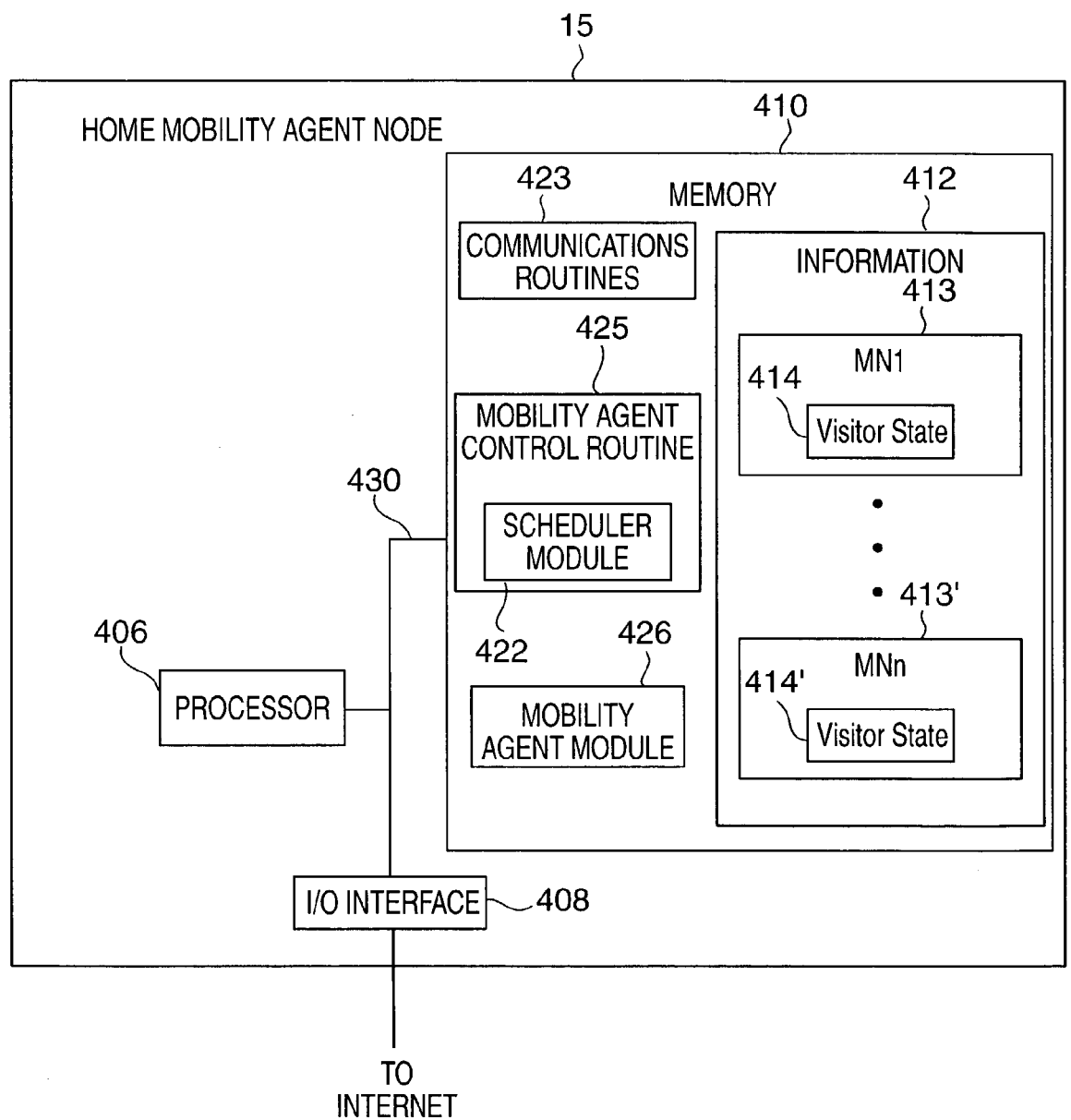
FIG. 4 illustrates an exemplary mobility agent node implemented in accordance with the present invention.

FIG. 4 illustrates an exemplary home mobility agent node 15 implemented in accordance with the invention. The mobility agent node 15 includes a bus 430 that couples together an I/O interface 408, a processor (e.g., CPU) 406 and memory 410. The I/O interface 408 couples the mobility agent node 15 to the Internet. The memory 410 includes routines, which when executed by the processor 406, cause the mobility agent node 15 to operate in accordance with the invention. Memory 410 includes communications routines 423 used for controlling the mobility agent node 15 to perform various communications operations and implement various communications protocols. The memory 410 also includes a mobility agent control routine 425 used to control the mobility agent node's 15 operation and signaling to implement the steps of the method of the present invention. The mobility agent node control routine 425 includes a scheduler module 422 used to control transmission scheduling and/or communication resource allocation. Thus, module 422 may serve as a scheduler. The memory 410 also includes a mobility agent module 426 used to process and send mobility related signaling implementing the steps of the method of the present invention. Thus, module 426 may serve as a Mobile IP Home Agent. Memory 410 also includes information 412 used by communications routines 423, control routine 425 and mobility agent module 426. The information 412 includes an entry 413, 413' for each active end node (MN1,MNn). In particular, information for end node 1 413 includes visitor state 414, shown in detail in FIG. 3. Information about end node N 413' includes visitor state 414' also shown in detail in FIG. 3, with the exception that the presence of the PCCoA flags (118, 128) is optional. This is because the PCCoA functionality is provided between the End Node 14 and the Access Node 12, does not need the assistance of the Home Agent 15 to invoke that functionality, and can be successfully implemented even when the Home Agent 15 otherwise believes that a traditional CCoA is being used by the End Node 14. Knowledge of the implementation of the PCCoA functionality may however be provided to the Home Agent 15 for management and policy purposes.

Figure 5:
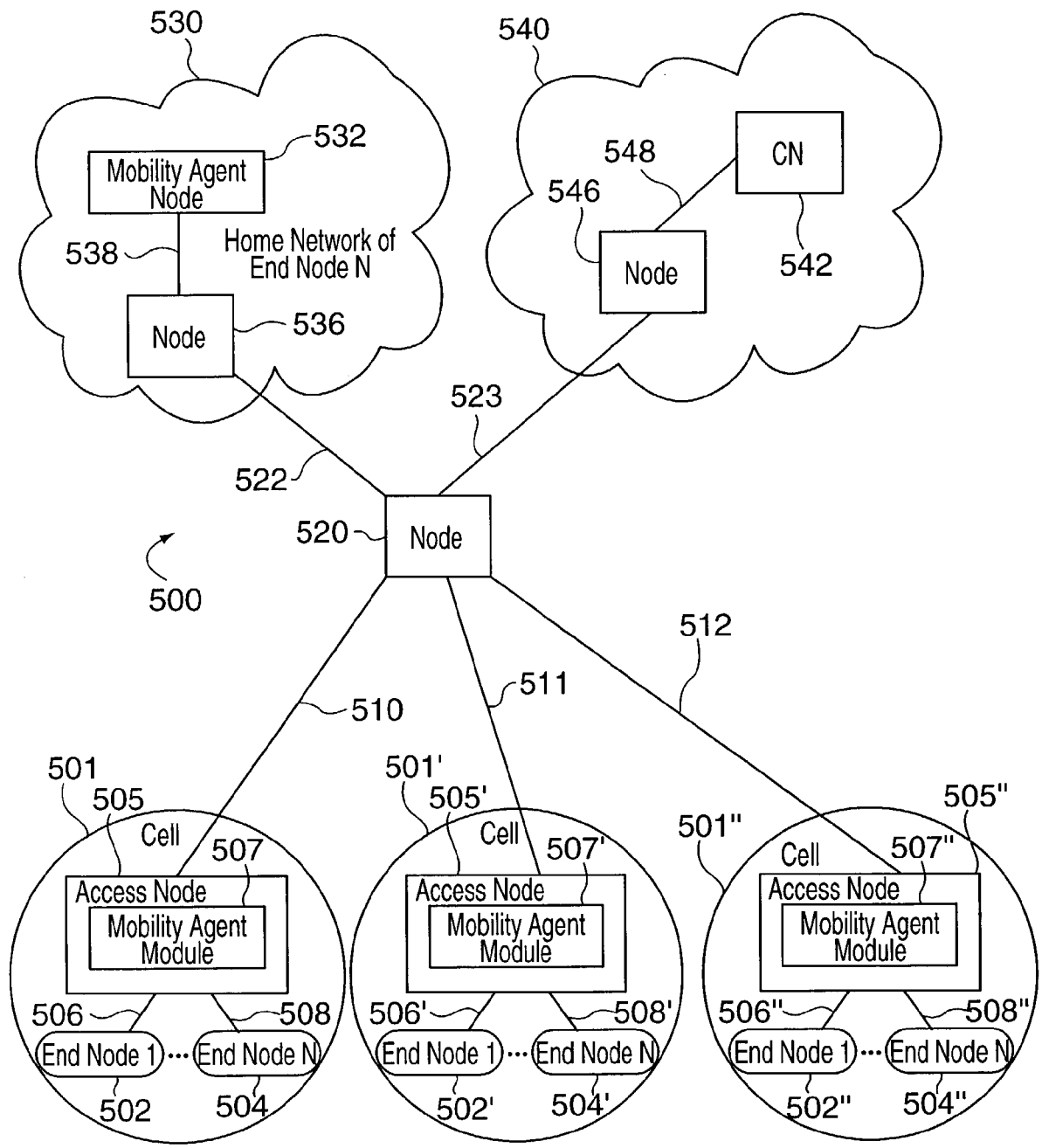
FIG. 5 illustrates a network diagram of an exemplary communications system in which the invention is applicable.

FIG. 5 illustrates an exemplary system 500 comprising a plurality of access nodes 505, 505', 505" implemented in accordance with the present invention. FIG. 5 also depicts communication cells 501, 501', 501" surrounding each access node 505, 505', 505", respectively, which represents the coverage area of corresponding access node 505, 505', 505", respectively. The same physical and functional elements are depicted in each of the communication cells (501, 501', 501"), thus the following description of the elements in the cell 501 surrounding access node 505 is directly applicable to each of the cells 501, 501', 501". The depiction of the access node 505 is a simplified representation of the access node 12 depicted in FIG. 1. For simplicity access node 505 is shown to include a mobility agent module 507 (corresponding to mobility agent module 226 of FIG. 1) responsible for the signaling implementing this present invention. FIG. 5 illustrates the access node 505 providing connectivity to a plurality of N end nodes 502, 504 (EN1, ENn) via corresponding access link 506, 508. End nodes 502, 504 are simplified versions of the end node 14 depicted in FIG. 2. End nodes 502, 504 may be, for example, mobile nodes (MNs) and links 506, 508 may be, for example, wireless links.

Interconnectivity between the access nodes 505, 505', 505" is provided through network links 510, 511, 512 and an intermediate network node 520. Home network 530 in FIG. 5 is coupled to the rest of the system 500 via link 522 and intermediate node 520. Home Network 530 further includes a network node 536 also connected to link 522 and a mobility agent node 532, connected to node 536 via link 538. Mobility Agent node 532 operates as mobility agent of at least end node N 504. Network 540 in FIG. 5 is coupled to the rest of the system 500 via link 523 and node 520. Network 530 further includes network node 546 also connected to link 523 and a correspondent node (CN) 542, connected to node 546 via link 548. CN 542 operates as corresponding node in a data session with at least end node N 504 for illustration of the methods of this present invention.

Figure 6:
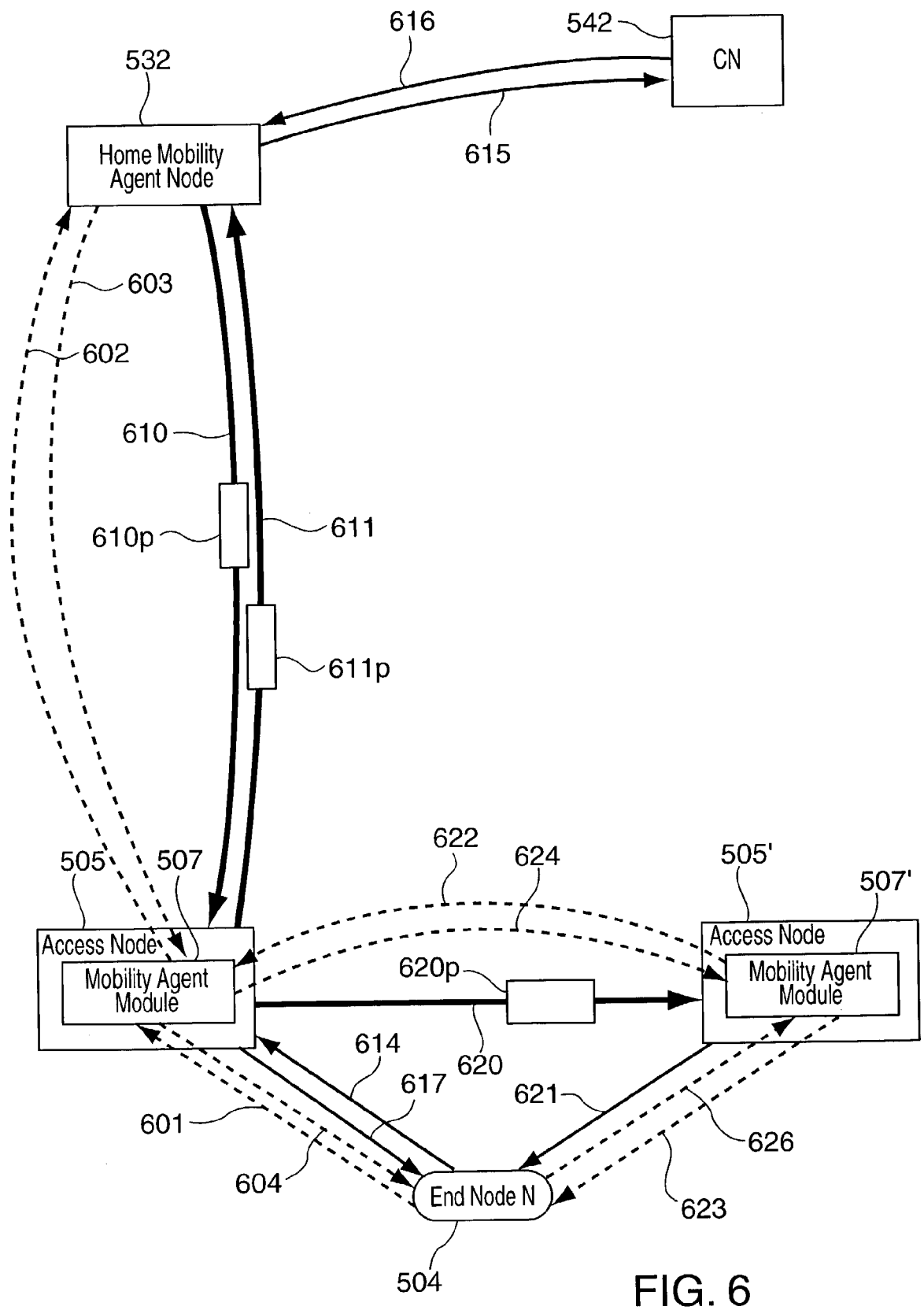
FIG. 6 illustrates exemplary signaling and packet flows for the network of FIG. 5.

FIGS. 6-9 illustrate exemplary embodiments of the various methods of this present invention. FIGS. 6-9 are simplified versions of the system FIG. 5 showing elements of FIG. 5, as needed, to further explain the present invention. FIG. 6 shows access nodes 505, 505', including mobility agent modules 507, 507', providing access to end node N 504. FIG. 6 also shows home mobility agent node 532 serving end node 504 and a CN node 542 being in a communication session with said end node 504. In FIG. 6. solid thin arrows depict data traffic and the direction of the arrow points to the destination of said data traffic; thick solid lines depict tunnels and the direction of the arrow points to the destination of said tunnel; dashed lines depict signaling messages used for the registration of exemplary end node N 504 to the access node 505 with foreign mobility agent module 507 and the home mobility agent node 532, and the direction of the arrow points to the destination of said signaling.

In FIG. 6 end node 504 sends registration request signal 601, including at least the address of the end node 504, the address of the mobility agent node 532, the address of the access node 505, an indication that the MN 504 is using a CCoA, and an additional indication that forward and reverse tunneling is required using a PCCoA, between the access node 505 and the home mobility agent 532. Access node 505 processes signal 601 via foreign mobility agent module 507, accepting the request for PCCoA functionality, setting the PCCoA flags 118, 128, and then forwarding registration request signal 602, also including at least a portion of the information included in signal 601, to mobility agent node 532. This portion may optionally include an indication of the setting up of the PCCoA functionality between the end node 504 and the access node 505.

Home Mobility agent node 532 receives signal 602 and sets up CCoA tunnel state associated with said end node 504 in its visitor state 414' of FIG. 4. Said CCoA tunnel state includes state for outgoing tunnel 610 (forwarding direction) and state for incoming tunnel 611 (incoming direction) according to the contents of message 602. Packets 610$p$ move through tunnel 610; packets 611$p$ move through tunnel 611. Packets 610$p$ originate from packets 616 which are sent from the CN 542 towards the home address of the end node N 504. These are received at the home agent 532 which encapsulates them into tunnel 610. Similarly, packets 611$p$ arrive at the home agent 532 where they are decapsulated to produce packets 615 towards the CN 542.

The source address of the outgoing tunnel 610 is set to the address of the mobility agent 532 and the destination address of the outgoing tunnel 610 is set to the CCoA of end node 504 while a lifetime 113 is associated with said state. The source address of the incoming tunnel 611 is set to the CCoA of the end node 504 and the destination address of the incoming tunnel 611 is set to the address of home mobility agent 532 while a lifetime 113 is associated with said state. Signal 603 is returned to the foreign mobility agent 507 to confirm the installation of the CCoA tunnel between the home mobility agent 532 and the CCoA of the end node 504. Signal 604 is then sent between the foreign mobility agent 507 and the end node 504 to confirm the acceptance of the registration and the specific installation of PCCoA processing for the home address of the end node 504, at the foreign mobility agent 507. Note that CCoA tunneling should otherwise result in a tunnel between the end node 504 and the home mobility agent 532.

The PCCoA processing at the foreign mobility agent 507, for traffic from the foreign mobility agent 507 to the end node 504, intercepts tunnel 610 that would normally terminate on the end node 504, decapsulates the inner packet from the tunnel 610, and then forwards the inner packet 617 within a point to point mac-layer link to the end node 504 that owns the CCoA from which the inner packet was decapsulated.

The PCCoA processing at the foreign mobility agent 507, for traffic to the foreign mobility agent 507 from the end node 504, receives the inner packet 614 within a point to point mac-layer link from the end node 504, encapsulates the inner packet 614 in a tunnel 611 to the home mobility agent 532, using the CCoA that matches the mac-layer address of the sending end node 504 as a source address, and the address of the home mobility agent 532 as a destination address. The PCCoA processing is described in detail in FIGS. 7-8.

Continuing with FIG. 6, during a hand-off between access nodes 505, 505', the end node 504 can send signal 601 to the old access node 505 to trigger signal 624 to the new access node 505', or can send signal 626 to the new access node 505' to trigger signal 622 to the old access node 505. Either sequence of signals can be used to redirect packets 614, 617 from the mac-layer link between the end node 505 and the old access router 505, to the mac-layer link between the end node 504 and the new access node 505', becoming packets 620$p$ and then packets 621 for packets towards the MN 504. The signals 601 or 622 include a request for PCCoA processing at the old access node (router) 505, and therefore can cause the old access node 505 to temporarily invoke PCCoA processing, during the hand-off, for packets addressed to the CCoA of the end node 504. This causes the old access node 505 to decapsulate packets addressed to the CCoA of the end node 504 that is undertaking the hand-off, and then re-encapsulate into the new CCoA of the end node 504 at the new access node 505'. If the end node 504 was already employing PCCoA functionality at the old access node 505 then the signals 601 or 622 simply redirect the forwarding of the unencapsulated packet, from the mac-layer link between the old access node 505 and the end node 504, to an IP tunnel 620 between the old access node 505 and the new CCoA of the end node 504 via the new access node 505'. Note that either signal 624 (from old access node 505 to new access node 505') or 626 (from EN 504 to new access node 505') can, as part of this hand-off sequence, additionally invoke PCCoA processing in the new access node 505', which will detunnel packets addressed to the new CCoA that arrive at the new access node 505', such as packets 620$p$, and forwarding them to the end node 504 over the mac-layer link that exists between the new access node 505' and that end node 504.

Figure 7A:
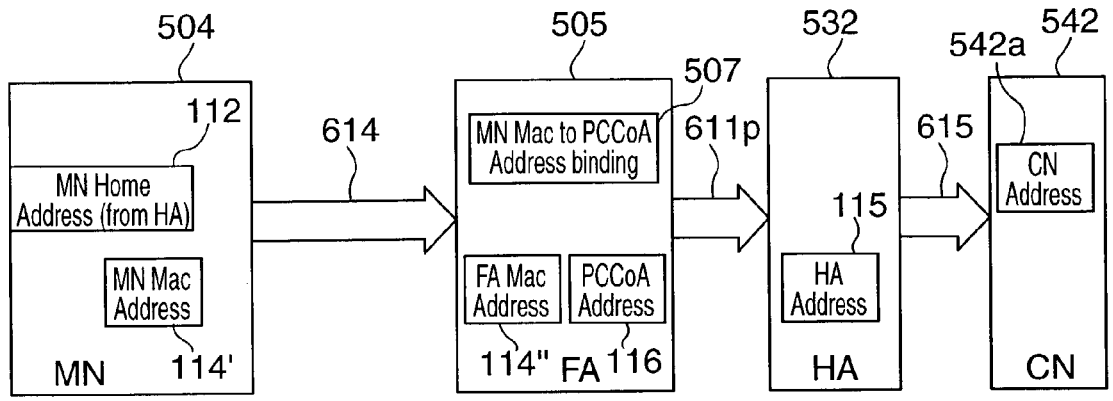
FIGS. 7A through 7C, referred to collectively as FIG. 7, illustrate PCCoA processing and packet forwarding for unicast packet flows.
Figure 7B:
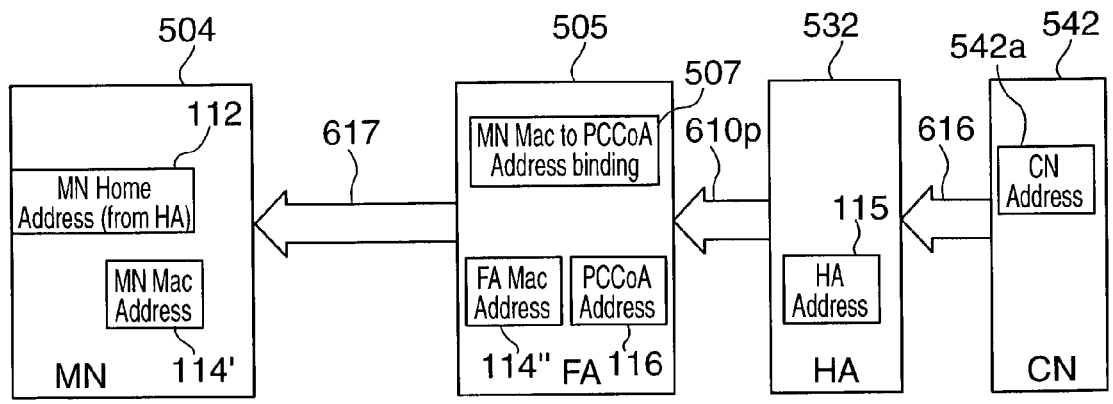
Figure 7C:
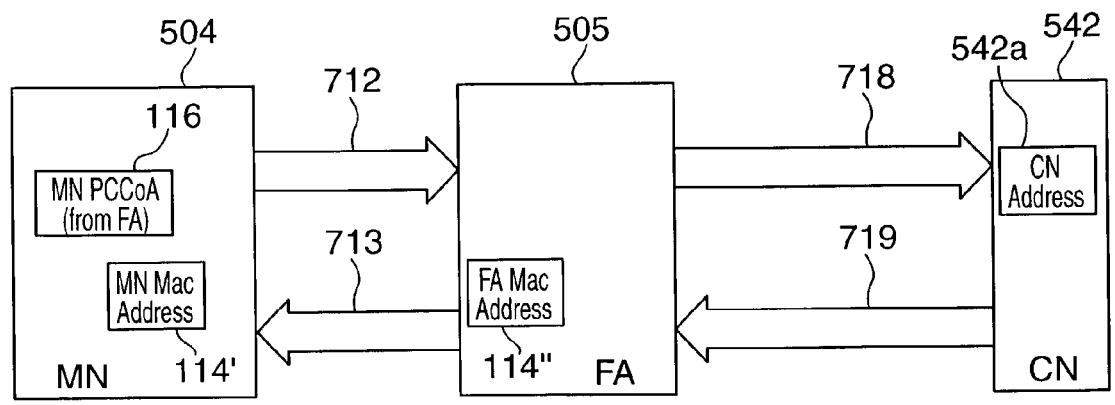

FIG. 7 shows the PCCoA processing in detail for unicast packets that are sent between the MN 504 and a CN 542. FIG. 7 shows the end node, e.g. Mobile Mode (MN) 504, the Foreign Agent (FA) Node 505, the home mobility agent (HA) 532 and the Correspondent Node (CN) 542. FIG. 7 is the composite of FIGS. 7*a*, 7*b*, 7*c* showing exemplary cases A, B, C respectively.

In case A of FIG. 7*a*, a unicast packet flow is shown from the home address 112 of the MN 504 to CN address 542*a*, the address of CN 542. The packet flow is broken up into three sections. Between the MN 504 and the FA 505, packets 614 are transmitted within mac-layer frames using point to point mac-layer addresses 114 (MN Mac address 114', FA Mac address 114") of the MN 504 and the FA 505. The mobility agent module 507 maps the source address of the mac-link frames to the PCCoA of the MN 504 that owns that mac-layer source address, and then encapsulates the packet 614 into the tunnel 611*p*. The HA 532 then decapsulates these packets and forwards them to the CN 542 as packets 615.

In case B of FIG. 7*b*, a unicast packet flow is shown to the home address 112 of the MN 504 from the CN 542. The packet flow is broken up into three sections. The HA 532 encapsulates packets 616 received from the CN 542 that are addressed to the home address 112, in the CCoA that has been registered in the HA 532 for that home address 112. The HA 532 then sends encapsulated packets 610*p* to the FA 505. These are received by the mobility agent module 507 in the FA 505 which decapsulates the packets 610*p* and maps the PCCoA destination address 116 from the tunnel 610 into the destination mac-layer link address 114' of the of the MN 504 that owns that PCCoA address. The FA 505 then sends the packets 617 to the MN 504 in point to point mac-layer frames using that destination mac-layer address 114' of the MN 504.

In case C of FIG. 7*c*, the MN 504 can use the PCCoA (from FA 505) 116 as a normal CCoA source and destination address for communications with CN 542, rather than using the home address 112 (from HA 532) as in FIGS. 7*a* and 7*b*. Packets 712 flow from MN 504 to FA 505, while packets 713 flow between FA 505 and MN 504. Between the MN 504 and the FA 505, packets 712, 713 are transmitted within mac-layer frames using point to point mac-layer addresses 114 (MN Mac address 114', FA Mac address 114") of the MN 504 and the FA 507. Packet flow 718 (from FA 505 to CN 542), 719 (from CN 542 to FA 507) does not visit the HA 532 as in FIGS. 7*a* and 7*b*, but only visits the mobility module 507 in FA 505 directly where it is mapped into and out of mac-frames as part of point to point link between the FA 505 and the MN 504 that has been assigned that PCCoA 116.

Therefore, the mobility agent module 507 encapsulates and decapsulates into the PCCoA 116 for the MN 504, when the MN 504 is using the home address 112 for communications with the CN 542 as in FIGS. 7*a* and 7*b*. In contrast, this encapsulation and decapsulation into the PCCoA 116 by the mobility agent module 507 of FA 505 is not required in case C of FIG. 7*c* where the MN 504 is using the PCCoA address 116 for communications with CN 542.

Figure 8A:
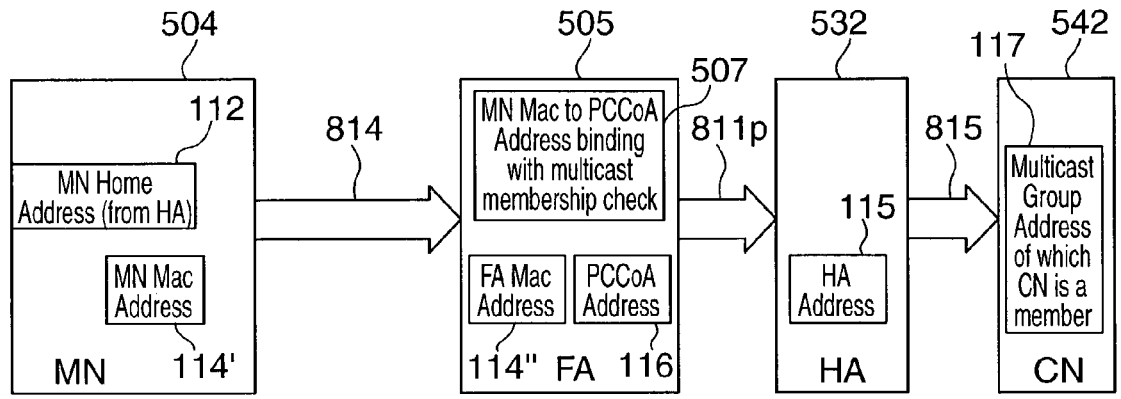
FIGS. 8A through 8C, referred to collectively as FIG. 8, illustrate PCCoA processing and packet forwarding for multicast traffic.
Figure 8B:
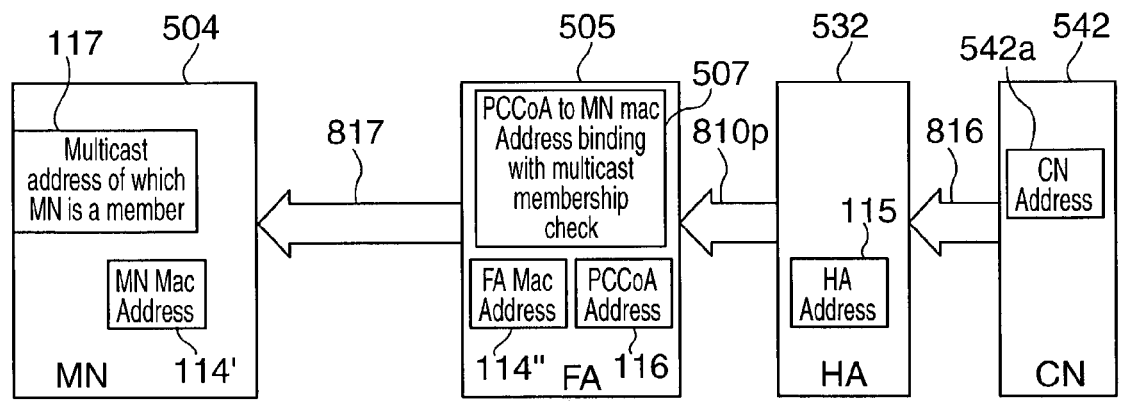
Figure 8C:
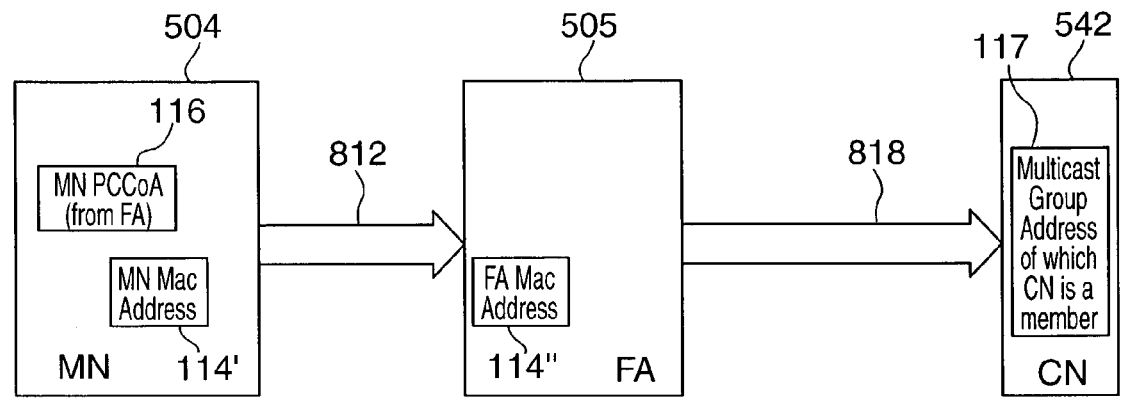

In FIG. 8, the PCCoA processing of the invention is further described for multicast traffic flows between the MN 504 and the CN 542. FIG. 8 is the composite of FIG. 8*a*, FIG. 8*b*, and FIG. 8*c* showing exemplary cases D, E, and F respectively.

In case D of FIG. 8*a*, a multicast packet flow is shown from the home address 112 of the MN 504 to the CN 542 that is a member of the multicast group whose multicast group address 117 is inserted into the destination address of packets in that flow. The packet flow is broken up into three sections. Between the MN 504 and the FA 5057814 are transmitted within mac-layer frames using point to point mac-layer addresses, 114 (114', 114") of the MN 504 and the FA 505, rather than multicast addresses. The mobility agent module 507 maps the source address of the mac-link frames to the PCCoA of the MN 504 that owns that mac-layer source address, and then encapsulates the packet 814 into the tunnel from the PCCoA address 116 to the HA address 115 of the HA 532, so producing packets 811*p*. The HA 532 then decapsulates these packets 811*p* and forwards them to the CN 542 as packets 815 via multicast routing.

In case E of FIG. 8*b*, a multicast packet flow is shown being forwarded to the MN 504 from the CN 542, when the MN 504 is a member of the multicast address 117 that the CN 542 inserts into the destination address of the packets in that packet flow. The packet flow is broken up into three sections. The HA 532 encapsulates packets 816 received from the CN 542 that are addressed to the multicast group address 117, in the CCoA that has been registered in the HA 532 for the MN 504. The HA 532 then sends encapsulated packets 810*p* to the FA 505. These are received by the mobility agent module 507 in the FA 505 which decapsulates the packets 810*p* and maps the PCCoA destination address 116 from the tunnel into the destination mac-layer link address of the of the MN 504 that owns that PCCoA address 116. The FA 505 then sends the multicast packets 817 to the MN 504 in point to point mac-layer frames, rather than multicast frames, using that destination mac-layer address 114' of the MN 504. The use of point to point mac-frames is required to ensure that only the target MN 504 from HA 532 with home address 112 can receive the multicast packet 817.

In case F of FIG. 8*c*, the MN 504 can use the PCCoA 116 as a normal CCoA source address for multicast communications with a CN 542 that is the member of a multicast group whose multicast address 117 is inserted into the destination address of a packet 812 by the MN 504. This packet flow 812 (from MN 504 to FA 505), 818 (from FA 505 to CN 542) does not visit the HA 532 but only visits the mobility module 507 in FA 505 directly where packets 812 are mapped out of mac-frames as part of point to point link between the MN 504 with MN Mac Address 114', that has been assigned that PCCoA 116 and the FA 505 with FA Mac Address 114".

Therefore, the mobility agent module 507 encapsulates packets into a tunnel with a PCCoA source address 116 for the MN 504, when the MN 504 sends packets with a home address 112 as a source address as in case D of FIG. 8*a*. In contrast, this encapsulation of packets by module 507 of FA 505 is not required in case F of FIG. 8*c* where the MN 504 is using the PCCoA address 116 for communications with CN 542.

Figure 9:
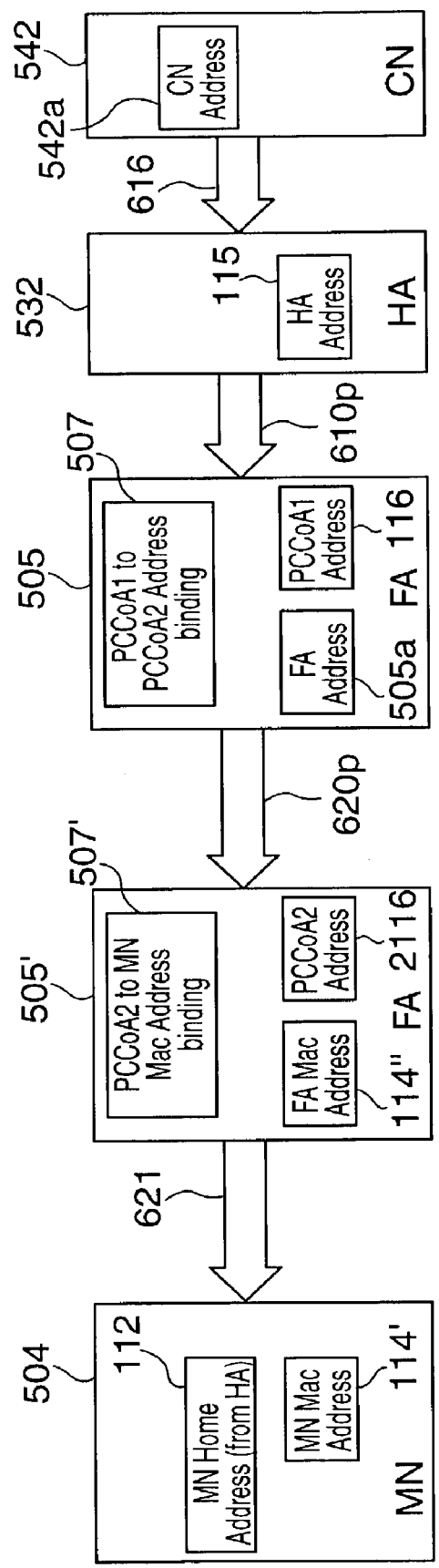
FIG. 9 illustrates PCCoA processing and packet forwarding for a hand-off between two foreign mobility agents.

FIG. 9 shows the PCCoA processing and packet forwarding during a hand-off when the MN 504 moves between FA 505, where the MN 504 is assigned CCoA1 116, and FA 505', where the MN 504 is assigned CCoA2 2116. In case G of FIG. 9, the unicast packet flow is shown to the home address 112 of the MN 504 from the CN 542. The packet flow is broken up into three sections. The HA 532 encapsulates packets 616 received from the CN 542 that are addressed to the home address 112, in the CCoA1 116 that has been registered in the HA 532 for that home address 112.

The HA 532 then sends encapsulated packets 610p to the FA 505. These are received by the mobility agent module 507 in the FA 505 which before the hand-off either forwards the packets directly to the MN 504 or applies PCCoA processing as described in case B. During the hand-off however, the MN 504 obtains a PCCoA1 116 from the FA 505 and a PCCoA2 2116 from the FA 505'. The FA 505 then decapsulates the packets 610p and maps the PCCoA1 116 destination address from the tunnel 610 into another tunnel 620 with PCCoA2 2116 as the destination address and the address of FA 505, 505a, as a source address. This mapping is stored in the visitor list state in FA 505. The FA 505 then sends the packets 620p to the FA 505' where they are received by the mobility agent module 507' in the FA 505'. The FA 505' then decapsulates the packets 620p and maps the PCCoA2 2116 destination address from the tunnel 620 into the destination mac-layer link address of the MN 504 that owns that PCCoA2 address 2116. The FA 505' then sends the packets 621 to the MN 504 in point to point mac-layer frames using that destination mac-layer address 114' of the MN 504. The PCCoA processing in the FAs 505 and 505' is installed using MIP hand-off signaling and lasts as long as the lifetime 113 5 avoids a double encapsulation wherein the FA 505 would further encapsulate the tunnel packet 610p destined to CCoA1 116 in a header with PCCoA2 2116 as a destination address.

Various modifications and additional signaling features are possible in accordance with the present invention. Some additional possible embodiments and signaling features will now be discussed.

In accordance with various embodiments of the invention, an HA will encapsulate permitted unicast, multicast and broadcast packets, intended for the MN HoA, with the CCoA included within the associated MIP Registrations. The HA then sends the packets to this CCoA from the source address of the HA. If reverse tunneling is enabled then the HA will decapsulate all permitted unicast, multicast and broadcast packets that are tunneled from the CCoA to the HA address, with the inner source address matching the HoA of the MN.

From the perspective of the HA, the CCoA is located at the MN and so requires the MIP signaling to have the 'D' bit set. However, as far as the FA is concerned the CoA is actually a PCCoA, which as far as Internet routing is concerned can be considered to be a MN specific FA CoA. The MN that is allocated this address is on a link-layer directly attached to the FA and so the FA can also enable the MN to make use of this MN specific FA CoA as a source/destination address for local communications. Therefore, the HA sees the PCCoA as a CCoA, the FA sees the PCCoA as a special MN specific FA CoA and the MN treats the PCCoA as an ordinary interface address. A specific implementation of the PCCoA process would be to simply move the tunnel/detunneling process to the other end of the link (from the MN to the FA) but in all other ways treat the address as a CCoA. This is then a link specific change in much the same way that header compression is a link specific function.

Proxy CCoA tunneling is therefore possible in MIP if the MN obtains a CCoA from the FA subnet, the MN then registers for PCCoA service via the FA, and that FA is able to support PCCoA processing for that CCoA. The HA forwarding and tunnel processing is unaffected by the changes proposed here. The availability of the PCCoA capability is advertised by the FA in a FAA, by setting the new 'P' bit, or could be triggered via an MIP extension, configuration, PPP, DHCP or other signaling. To request PCCoA service, the MN should register via the FA, whether or not this is mandated by the FAA 'R' bit, so that the FA can undertake correct PCCoA processing. The MN can be allocated a PCCoA either by a unicasted MIP FAA that includes a MN specific FA CoA, through a DHCP server with a FA specific prefix, or by any other means that can ensure the address is uniquely bound to a MN on the FA.

Proxy CCoA tunnelling is negotiated, in some embodiments, by the MN by including the Proxy CCoA extension in the MIP Registration as well as setting the 'D' flag used to signal the use of a CCoA. This structure is used so that the FA can remove the PCCoA extension whilst leaving the 'D' bit so that the HA will continue to treat the MN as if it had a CCoA. In the future, if HAs require knowledge of the PCCoA mechanism, and sufficient deployment has/will occur, then the extension mechanism could be replaced by instead assigning and setting a new 'P' flag bit (proxy CCoA) in the MIP Registration, as well as setting the 'D' bit (CCoA). Such implementations are to be considered within the scope of the invention.

The MIP CCoA Registration, is acknowledged by the HA and then the FA in the MIP Reply causes the FA to store both the HoA and the PCCoA in the visitor list for that MN. Both the HoA and the PCCoA can be used as source/destination addresses to/from the MN. The HoA is used for remote access to/from the HA whilst the PCCoA can be used for topologically correct local access whilst the MN remains at that FA.

Downlink Forwarding as implemented in various embodiments will now be discussed.

Downlink packets addressed to the HoA, arrive at the FA via the HA, encapsulated in the PCCoA of the MN. Downlink packets (local traffic using the PCCoA as a source/dest address) otherwise arrive directly, and unencapsulated, at the FA. The FA inspects the PCCoA and searches for it in a visitor list maintained by the FA. If the packet is unencapsulated then it is simply forwarded to the owning MN. If the packet is encapsulated then it is first decapsulated and the inner unicast destination header inspected to ensure it matches the HoA state for that MN. If the decapsulated packet is broadcast/multicast, and the MIP flags for that MN have requested broadcast traffic and/or the MN is a member of that multicast group, then the packet is forwarded unencapsulated to the MN over a point-to-point access medium but must be sent in its encapsulated form over a broadcast medium.

Uplink forwarding and reverse tunnelling will now be discussed. Uplink unicast packets from the HoA are sent unencapsulated via the FA and injected into the routing fabric unencapsulated. In the case of reverse tunneling, the FA encapsulates the permitted unicast, broadcast and multicast packets with the PCCoA of the MN as the tunnel source address, and HA as the tunnel destination address. This is so that the packets will match the registered binding in the HA. Broadcast/multicast packets sent over a broadcast access medium must be encapsulated in the HoA source address and sent to the shared FA CoA where they are decapsulated, the visitor list and group membership for that MN inspected, and permitted packets re-encapsulated to the HA as before using the PCCoA. Note that with proxy CCoA tunneling the option for selective reverse tunneling from the MN is lost. However, this ability can be re-instated if the MN provides the FA with a classifier that specifically defines which of the MNs uplink traffic should not be reverse tunneled. This is achieved by first selecting Reverse tunneling for a specific HoA by setting the 'T' bit as normal in the MIP Registration, and then including a set of excluded classifiers in the form of quintuples describing the uplink unicast header.

PCCoAs and smooth Hand-offs will now be discussed. Smooth hand-offs [RoutOp] enable a MN that was previously registered at the old Foreign Agent (oFA) with an oFA CoA, to request the forwarding of packets, sent to the MN HoA and decapsulated from the oFA HoA, to the MNs new CoA. RoutOp refers to C. Perkins, D. Johnson, "Route Optimization in Mobile IP", Internet-Draft, draft-ietf-mobileip-optim-11.txt (work in progress), Sep. 6, 2001.

This means however, that smooth hand-offs are not supported for a MN with a CCoA that is either registered or unregistered at the oFA. This is because a FA is not allowed to decapsulate from the oCCoA and forward to the new CoA at the new point of attachment. Smooth forwarding could be supported by instead having the oFA additionally encapsulate the oCCoA to the nCoA but this clearly adds overhead and requires the nFA to have knowledge of the oCCoA to correctly forward in the case of the MN acquiring a nFA CoA.

The PCCoA capability in contrast brings the required functionality to the FA to support the smooth forwarding of CCoAs, if the MN registered via the oFA, irrespective of whether or not the MN is using a CCoA or a PCCoA. In the case of a normal CCoA, the FA can still transiently support the PCCoA capability and automatically transition the CCoA to a PCCoA when the BU is received from the nFA or directly from the MN. This is possible when the CCoA is uniquely advertised by that FA. The incoming BU that includes the nCoA will then create a binding between the HoA (and indirectly the oCCoA) and the nCCoA, such that the oFA can decapsulate everything from the oCCoA and re-encapsulate into the nCoA before forwarding. Broadcast/multicast traffic is handled by checking the MIP flags and the HoA group membership and re-encapsulating all permitted packets. The oFA will also encapsulate into the nCoA all packets that are received unencapsulated with a destination address equal to the oCCoA (local traffic using the oCCoA as a network address) during the shorter of the lifetime of the smooth hand-off or the delay until the oCCoA is re-allocated. The request to trigger transient PCCoA support is implicit at the oFA on the reception of a BU. In the case of a MN that was using a PCCoA at the oFA, the meaning of the BU is again implicit and the oFA simply proceeds as for the oCCoA after the PCCoA transition.

If the BU is from the MN then it is for a CCoA at a MN that is not registering via the nFA. This however does not affect this hand-off but will affect subsequent hand-offs because the PCCoA transient forwarding is only possible if a MN registers via a FA. If the BU is originated by the nFA then the nCoA in the BU is either a nFA CoA or a nPCCoA, which affects the processing at the oFA. This is because the sending of a nFA CoA implies that the nFA does not support PCCoAs and therefore the oFA (which does support PCCoAs) should undertake all processing required to convert the oCCoA or the oPCCoA received traffic into a format that will be correctly received and forwarded by the nFA. This means that any broadcast/multicast traffic should be first encapsulated into the HoA of the MN before encapsulating into the nFA CoA. It also means that the BU should specifically indicate whether it is for a FA CoA or a CCoA/PCCoA by setting the new 'D' bit. The 'D' bit is set in the BU if the MIP Registration via the nFA had either the 'D' or the 'P' bit set, or is set by the MN that is using a CCoA. The difference at the nFA between a CCoA and a PCCoA is kept within the nFA, and between the nFA and the MN that requested a PCCoA by including the PCCoA extension in its registration.

The BU is otherwise unchanged. In addition, the mandatory BUack and its status codes do not need to be extended because the failure of the BU for technical reasons at the oFA, for a CCoA, directly implies a PCCoA processing failure.

When considering reverse smooth tunneling, the mechanisms are unchanged for PCCoAs other than that the reverse smooth tunneling is now between MN specific and shared FA CoAs, rather than just between shared FA CoAs. The smooth BU will include both 'T' and 'D' bits set and the reverse tunneling will be from the nCCoA to the oFA CoA and then from the oCCoA/PCCoA to the GFA/HA. Broadcast/multicast must be reverse tunneled according to the required processing at the receiver for the CoA type.

PCCoA Advantages

These procedures avoid the CCoA encapsulation for remote access traffic over the access link. In addition, the FA is now in a position to police traffic addressed to a specific HoA from a specific gateway, via the PCCoA, before it is sent to the MN, and can also effectively support smooth hand-offs for all CCoAs. In the case of broadcast/multicast the FA is now in a position to avoid the additional encapsulation over the air in both directions when the access medium supports point to point link layer connectivity to/from the MN. Finally, the MN specific FA CoA (i.e. PCCoA) MIP encapsulation simplifies address-based QoS support in the network between the HA and the MN, when compared to a shared FA CoA, when the FA supports QoS aware address allocation, because the address QoS class can be used by network classifiers in scheduling decisions.

New Packet Formats

Mobility Agent Advertisement Extension

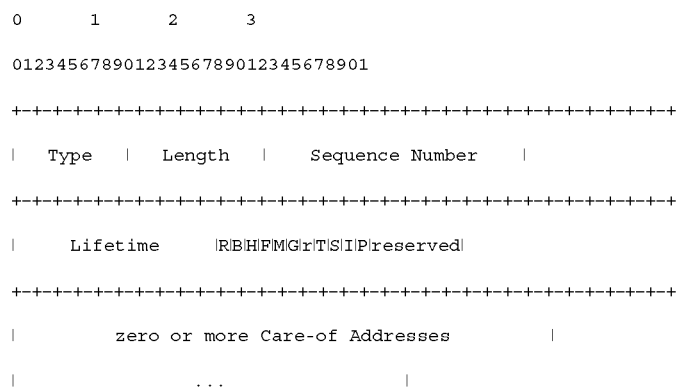

The Mobility Agent Advertisement Extension described in [MIPv4] C. E. Perkins, Ed. "IP Mobility Support for IPv4", RFC3220, January 2002, is changed by the addition of a 'P' bit:

P Agent offers proxy CCoA tunneling.

A foreign agent that sets the 'P' bit SHOULD support the proxy CCoA tunneling for any CCoAs that are uniquely advertised into the routing system by that FA. Using this information, a mobile node is able to choose a foreign agent that supports proxy CCoA tunneling. Notice that if a mobile node does not understand this bit, it simply ignores it as per [MIPv4] and reverts to normal CCoA behaviour. The ordering of addresses in FAAs is according to the relevant MIP specs and is not altered by this draft.

Proxy CCoA Extension

The Proxy CCoA Extension should only be included if the 'D' bit is set and the MN is registering via the FA. If this extension is absent, and the 'D' bit is set, then normal CCoA behaviour from Mobile IP [MIPv4] and RevTun is undertaken. RevTun refers to G. Montenegro, Ed. "Reverse Tunneling for Mobile IP", revised, Internet RFC 3024, January 2001. The Encapsulating Delivery Style extension and the Proxy CCoA extension should not be in the same registration. Mobile Nodes and Foreign agents should support the Proxy CCoA Extension.

```
 0                   1
 0 1 2 3 4 5 6 7 8 9 0 1 2 3 4 5
+-+-+-+-+-+-+-+-+-+-+-+-+-+-+-+-+
|    Type    |   Length   |   Type: TBA, Length 0.
+-+-+-+-+-+-+-+-+-+-+-+-+-+-+-+-+
```

New Registration Reply Codes

Foreign agent registration replies SHOULD convey if the PCCoA request failed. These new reply codes are defined:

Service denied by the foreign agent:
X1 PCCoA capability is mandatory
X2 PCCoA capability is administratively barred
X3 submitted PCCoA is not routable at the FA
X4 submitted PCCoA unavailable In response to a Registration Request with the 'D' bit set, and accompanied by the PCCoA extension, mobile nodes may receive (and should accept) code 70 (poorly formed request) from foreign agents. However, foreign agents that support PCCoA capability should use the appropriate new code.

If the MN registers via the FA with the 'D' bit set, and does not include the PCCoA extension, then code X1 should be returned to the MN to cause the MN to include the extension in any new request. If the MN does include the PCCoA extension and it is either administratively barred from using this capability (through either foreign or home AAA policy state), then code X2 should be returned to cause the MN to modify the Registration. Code X3 should be used if the MN attempts to use as a CCoA an address that is not routable at the FA, and code X4 should be used if the included address is already being used by another MN. In either case, the MN should attempt to get a new PCCoA for the local FA, either from the FA or via some other method.

Binding Update Message

In various exemplary emobodiments, the known binding Update message of MIPv4 is modified as described below in accordance with the various embodiments of the invention. A new BU flag, the 'D' flag, is added to indicate a request for smooth forwarding of the oCoA to the nCCoA/nPCCoA. The BU 'D' flag is only set if the MIP Registration to the nFA, that generated the BU also has the 'D' bit set.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |A|I|M|G|D|Rsv|         Lifetime              |
+-+-+-+-+-+-+-+-+-+-+-+-+-+-+-+-+-+-+-+-+-+-+-+-+-+-+-+-+-+-+-+-+
|                    Mobile Node Home Address                   |
+-+-+-+-+-+-+-+-+-+-+-+-+-+-+-+-+-+-+-+-+-+-+-+-+-+-+-+-+-+-+-+-+
|                        Care-of Address                        |
+-+-+-+-+-+-+-+-+-+-+-+-+-+-+-+-+-+-+-+-+-+-+-+-+-+-+-+-+-+-+-+-+
|                                                               |
+                        Identification                         +
|                                                               |
+-+-+-+-+-+-+-+-+-+-+-+-+-+-+-+-+-+-+-+-+-+-+-+-+-+-+-+-+-+-+-+-+
|Extensions...
+-+-+-+-+-+-+-+-
```

It is generally preferable that a BU with the 'D' bit set should also have the 'A' bit set so that the BU sender has confirmation that the forwarding will occur. The absence of this flag indicates that the CoA in the BU is a nFA CoA. If the oCoA is either a CCoA or a PCCoA, then the absence of this flag causes the oFA to try to convert any arriving flows so that they are compatible with the destination nFA CoA. This specifically means that any permitted broadcast/multicast traffic, and any packets with the oCCoA/PCCoA as an unencapsulated destination address (local traffic), should first be encapsulated into the HoA before being additionally encapsulated into the nFA CoA in the BU.

Binding Acknowledge Message

The format of the MIPv4 Binding Acknowledge message is unchanged, apart from extending the allowed values of the status field to cover the same cases as identified for the MIP Reg. The processing is such that if a BU is sent with the 'D' bit set that does not also have the 'A' bit set, then the oFA should still accept the request, if in all other ways correct, and return an acknowledgement.

The present application hereby expressly incorporates the U.S. Provisional Patent Application listed in the Related Application section of this patent application. However, it is to be understood that any mandatory language such as, e.g., must, is required, and necessary, found the provisional application is to be interpreted as applying to the examples and embodiments described in the particular provisional application and in no way limits the scope of the claims or invention described in the text of this application which is not incorporated by reference.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s). The methods and apparatus of the present invention are applicable to a wide range of communications systems including many OFDM, CDMA and other non-OFDM systems.

The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Numerous additional variations on the methods and apparatus of the present invention described above will be apparent to those skilled in the art in view of the above description of the invention. Such variations are to be considered within the scope of the invention.

What is claimed is:

1. A communications method comprising;
   operating a first node to transmit a packet towards a second node using a first address of the first node as a source address and a second address, associated with the second node, as a destination address,
   operating a third node to intercept said packet and encapsulate it into a tunnel using a third address which serves as a source address for said tunnel, said third address having a first prefix, said first prefix being associated with the third node, said third address being assigned to said first node, and using a fourth address corresponding to a fourth node serving as a destination address of said tunnel, said first address corresponding to said first node including a second prefix corresponding to said fourth node, and
   transmitting said first encapsulated packet to said fourth node.

2. The communications method of claim 1 wherein said first node is a first mobile node, wherein said second node is a second mobile node, wherein said first address is a home address of said first mobile node and said third address is a co-located care of address.

3. The communications method of claim 1, wherein said first and second prefixes are different, each of said prefixes corresponding to a different addressing domain.

4. The communications method of claim 1, further comprising:
   operating the third node to receive a second encapsulated packet with a destination address equal to said third address and a source address equal to said fourth address, said second encapsulated packet including an inner packet having said second address as a source address and said first address as a destination address,
   operating the third node to decapsulate said inner packet and forward the inner packet to the first node.

5. The method of claim 4, further comprising:
   communicating at least one mobile IP signal to said third node to cause said third node to perform said decapsulating and forwarding steps.

6. The method claim 4, wherein the third node is a MIP Local Mobility Agent.

7. The method claim 6, wherein the MIP Local Mobility Agent is one of a MIP Foreign Agent and a MIP Mobility Attendant.

8. The method of claim 4, wherein the fourth node is one of a MIP Home Agent and a MIP Regional Mobility Agent.

9. The method of claim 5 wherein the first node is a MIP Mobile Node, and the second node is a MIP Correspondent Node.

10. The method of claim 4 wherein the forwarding of the inner packet to the first node additionally involves the step of comparing the third address in said encapsulated packet to a table of visitor list entries in the third node,
   said table including a visitor list entry for the first node including at least one mapping between said third address and a MAC layer destination address of said first node, and wherein said step of forwarding the inner packet includes constructing at least one MAC layer frame including said MAC layer destination address corresponding to said first node and at least a portion of said inner packet.

11. The method of claim 1, wherein the second address is a multicast group address representing a plurality of second nodes who are members of said multicast group, and a point to point mac-layer link exists between the first and third nodes.

12. The method of claim 4 wherein the first address is a multicast group address representing a plurality of first nodes who are members of said multicast group, and a point to point mac-layer link exists between the third and the first node.

13. The method of claim 5 wherein the first node sends said at least one MIP signal to the third node indicating that said decapsulation and forwarding steps are to be performed.

14. A communications method, comprising:
operating a first node to transmit a packet towards a second node using a first address of the first node as a source address and a second address, associated with the second node, as a destination address,
operating a third node to:
  i) intercept said packet and encapsulate it into a tunnel using a third address which serves as a source address for said tunnel, said third address having a first prefix, said first prefix being associated with the third node, said third address being assigned to said first node, and using a fourth address corresponding to a fourth node serving as a destination address of said tunnel, said first address corresponding to said first node including a second prefix corresponding to said fourth node;
  ii) transmit said first encapsulated packet to said fourth node;
  iii) receive a second encapsulated packet with a destination address equal to said third address and a source address equal to said fourth address, said second encapsulated packet including an inner packet having said second address as a source address and said first address as a destination address;
  iv) decapsulate said inner packet and forward the inner packet to the first node; and
  v) receive, prior to receiving said second encapsulated packet, at least one mobile IP (MIP) signal used to cause said third node to perform said decapsulating and forwarding steps; and
wherein the at least one MIP signal is a MIP hand-off signal sent towards the third node, said signal indicating that the third node should temporarily undertake said decapsulating and forwarding steps and that said forwarding of the inner packets should involve forwarding said inner packet towards a fifth address at a fifth node, said fifth address being assigned to the first node.

15. The method of claim 14, wherein said fifth node is an access node.

16. The method of claim 15, wherein the forwarding of the inner packet towards the fifth node involves the step of comparing the third address in said encapsulated packet to a table of visitor list entries in the third node,
said table including a visitor list entry for the first node including at least one mapping between said third address of the first node and said fifth address of the first node and wherein said step of forwarding the inner packet includes encapsulating the inner packet in a tunnel with a source address equal to the third node address and the destination address corresponding to said fifth address from the fifth node.

17. The method of claim 4 further comprising:
operating the third node to receive encapsulated packets including the third address as a source or destination address and to forward said packet to the destination address included in said packet.

18. A third node for use in a communications system including a first node and a second node, the first node transmitting a packet towards the second node using a first address, of the first node as a source address and a second address, associated with the second node, as a destination address the third node comprising:
means for intercepting said packet and encapsulating said packet into a tunnel using a third address which serves as a source address for said tunnel, said third address having a first prefix, said first prefix being associated with the third node, said third address being assigned to said first node, and using a fourth address corresponding to a fourth node serving as a destination address of said tunnel, said first address corresponding to said first node including a second prefix corresponding to said fourth node, and
means for transmitting said first encapsulated packet to said fourth node.

19. The third node of claim 18 wherein said first node is a first mobile node, wherein said second node is a second mobile node, wherein said first address is a home address of said first mobile node and said third address is a co-located care of address.

20. The third node of claim 19, wherein said first and second prefixes are different, each of said prefixes corresponding to a different addressing domain.

21. A computer readable medium including computer executable instructions for controlling a third node in a communications system to implement a communications method, the communications system including a first node and a second node, the first node transmitting a packet towards the second node using a first address of the first node as a source address and a second address, associated with the second node, as a destination address the communications method comprising:
intercepting said packet and encapsulating said packet into a tunnel using a third address which serves as a source address for said tunnel, said third address having a first prefix, said first prefix being associated with the third node, said third address being assigned to said first node, and using a fourth address corresponding to a fourth node serving as a destination address of said tunnel, said first address corresponding to said first node including a second prefix corresponding to said fourth node, and
transmitting said first encapsulated packet to said fourth node.

22. A third node in a communications system, the communications system including a first node and a second node, the first node transmitting a packet towards the second node using a first address of the first node as a source address and a second address, associated with the second node, as a destination address, the third node comprising a processor configured to control the third node to perform the steps of:
intercepting said packet and encapsulating said packet into a tunnel using a third address which serves as a source address for said tunnel, said third address having a first prefix, said first prefix being associated with the third node, said third address being assigned to said first node, and using a fourth address corresponding to a fourth node serving as a destination address of said tunnel, said first address corresponding to said first node including a second prefix corresponding to said fourth node, and transmitting said first encapsulated packet to said fourth node.

* * * * *